(12) United States Patent
Faria

(10) Patent No.: US 11,326,648 B2
(45) Date of Patent: May 10, 2022

(54) BELT PULLEY DECOUPLER

(71) Applicant: SCHAEFFLER TECHNOLOGIES AG & CO. KG, Herzogenaurach (DE)

(72) Inventor: Christof Faria, Erlangen (DE)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 704 days.

(21) Appl. No.: 16/312,348

(22) PCT Filed: Jun. 22, 2017

(86) PCT No.: PCT/DE2017/100528
§ 371 (c)(1),
(2) Date: Dec. 21, 2018

(87) PCT Pub. No.: WO2017/220081
PCT Pub. Date: Dec. 28, 2017

(65) Prior Publication Data
US 2019/0234464 A1    Aug. 1, 2019

(30) Foreign Application Priority Data
Jun. 22, 2016 (DE) .......................... 102016211141.8

(51) Int. Cl.
*F16D 3/12* (2006.01)
*F02N 11/04* (2006.01)
*F16H 55/36* (2006.01)
*F16D 3/72* (2006.01)
(Continued)

(52) U.S. Cl.
CPC ................ *F16D 3/12* (2013.01); *F02N 11/04* (2013.01); *F02N 15/022* (2013.01); *F02N 15/08* (2013.01);
(Continued)

(58) Field of Classification Search
CPC ... F16D 3/12; F16D 3/72; F16H 55/36; F16H 2055/366; F02N 11/04
See application file for complete search history.

(56) References Cited

U.S. PATENT DOCUMENTS 7,618,337 B2 * 11/2009 Jansen ...................... F16D 3/72
474/74
8,021,253 B2 * 9/2011 Dell ........................ F02N 15/08
474/74
(Continued)

FOREIGN PATENT DOCUMENTS

CN    101432541 A    5/2009
CN    102906464 A    1/2013
(Continued)

OTHER PUBLICATIONS

International Search Report for International Application No. PCT/DE2017/100528 dated Oct. 18, 2017.

*Primary Examiner* — Michael R Mansen
*Assistant Examiner* — Mark K Buse
(74) *Attorney, Agent, or Firm* — Rutan & Tucker LLP; Hani Z. Sayed

(57) ABSTRACT

A belt pulley decoupler for the drive torque transmission between a belt of a starter-generator belt drive and the starter generator is provided. A hub is fastened on a generator shaft of the starter generator. A decoupler spring is configured to transmit drive torque of the belt from the belt pulley to the hub when the starter generator is powered. A rotary stop has a stop part on the belt pulley and a stop part on the hub. The rotary stop is configured to transmit drive torque of the generator shaft from the hub to the belt pulley when the starter generator is driving the belt. The decoupler spring is loaded in both torque directions and participates in the (Continued)

transmission of the drive torque from the hub to the belt pulley when the starter generator is driving the belt.

13 Claims, 5 Drawing Sheets

(51) Int. Cl.
    *F16H 7/00*         (2006.01)
    *F02N 15/02*       (2006.01)
    *F02N 15/08*       (2006.01)

(52) U.S. Cl.
    CPC ............... *F16D 3/72* (2013.01); *F16H 7/00* (2013.01); *F16H 55/36* (2013.01); *F16H 2055/366* (2013.01)

(56) References Cited

U.S. PATENT DOCUMENTS

| | | | |
|---|---|---|---|
| 8,888,622 B2 * | 11/2014 | Chen | F16D 13/76 474/94 |
| 9,709,153 B2 * | 7/2017 | Chang | F16H 55/36 |
| 2011/0245000 A1 * | 10/2011 | Serkh | F16F 15/1217 474/94 |
| 2015/0075943 A1 * | 3/2015 | Williams | F16D 3/12 192/41 S |
| 2015/0122610 A1 * | 5/2015 | Antchak | F16F 15/1216 192/41 S |
| 2015/0260265 A1 * | 9/2015 | Agnitch | F16H 7/18 474/171 |
| 2016/0069418 A1 | 3/2016 | Schneider | |

FOREIGN PATENT DOCUMENTS

| | | |
|---|---|---|
| CN | 105317971 A | 2/2016 |
| EP | 1730425 B1 | 3/2008 |
| EP | 2010792 B1 | 3/2015 |
| JP | 2007205379 A | 8/2007 |
| WO | 2004011818 A1 | 2/2004 |
| WO | 2013124009 A1 | 8/2013 |

* cited by examiner (Stand der Technik)

__BELT PULLEY DECOUPLER__

CROSS-REFERENCE TO RELATED APPLICATIONS

This application is the U.S. National Phase of PCT/DE2017/100528 filed Jun. 22, 2017, which claims priority to DE 102016211141.8 filed, Jun. 22, 2016, the entire disclosures of which are incorporated by reference herein.

TECHNICAL FIELD

The disclosure relates to a belt pulley decoupler for the drive torque transmission between the belt of a starter generator belt drive and the starter generator.

BACKGROUND

Belt pulley decouplers (also called isolators) compensate torsional vibration and unevenness introduced by the crankshaft of an internal combustion engine into its auxiliary belt drive and are typically arranged on the generator. If the generator involves a starter generator, which drives the internal combustion engine as an electric motor for the purpose of starting or boosting via the belt drive, it is not easy to freewheel the generator shaft which is normally done with generator decouplers. Instead, the pulley decoupler must lock in this relative direction of rotation in order to be able to transmit the drive torque generated by the starter generator to the belt via the hub and pulley.

A generic belt pulley decoupler has been disclosed in EP 2 010 792 B1. It has a rotary stop which transmits the drive torque of the driving starter generator from the hub to the belt pulley. A significant disadvantage of this construction is the high noise generation caused by the rotary stop due to the hard hitting stop parts when the starter generator rotates the hub in relation to the pulley and starts driving the pulley.

Another generic belt pulley decoupler has been disclosed in EP 1 730 425 B1 and is designed in such a way that the decoupler spring is a screwdriver spring which can be loaded in both directions of rotation, i.e. in opening and closing direction. In one direction of rotation, the spring decouples the drive torque emanating from the belt and transmits it to the starter generator, and in the other direction of rotation, the spring acts as a wrap band, which can change its diameter and which either opens or contracts due to the start or boost torque, and in doing so loops the belt pulley against the hub so that it cannot rotate. A disadvantage of this construction is the considerable difficulty to implement the different functions of the spring and the wrap band in the same component in a satisfying manner.

On this basis, the present disclosure has an objective of providing a belt pulley decoupler of the type mentioned above with an improved mode of operation in start or boost operation of the (driving) starter generator.

Accordingly, the decoupler spring is loaded in both directions and takes an active part in transmitting the drive torque from the hub to the belt pulley when the starter generator is driving.

The distribution of the drive torque transmission between the rotary stop and the decoupler spring connected virtually parallel thereto causes the relative rotation from hub to pulley to take place before the stop parts meet against resistance as a result of the increasing torque exerted in the process on the decoupler spring, so that the impact speed of the stop parts is limited to an acoustically acceptable value. In addition, the mechanical load of the rotary stop is reduced in accordance with the proportion of torque transmitted by the decoupler spring. Depending on the mutual rotatability of pulley and hub between the rotary stop, the amount of the start or boost torque and the stiffness of the decoupler spring, its proportion of torque can assume values of up to 50% or even higher.

The rotary stop can comprise one or more stop part pairs. The angle of rotation by which the belt pulley can be rotated in relation to the hub decreases with increasing number and/or extensive extension (thickness) of the stop parts.

In one embodiment, the decoupler spring is a torsion spring which extends in axial direction of the belt pulley decoupler and the spring ends of which are in both torque directions attached in form-fit manner with a spring plate of the belt pulley and with a spring plate of the hub. The diameter of the torsion spring is expanded or constricted depending on the direction of rotation of the transmitted drive torque.

The stop part of the hub is to be formed by (at least) one driver which can be rotated in (at least) one recess restricted by the stop part of the belt pulley. The recess can be formed directly in the pulley or by a driver ring fastened in it. The driver can be elevated locally either axially or radially with respect to the cylindrical shape of the hub.

In addition, a slide rail with (at least) one axial projection can be arranged between the driver ring and the end face of the hub facing away from the torsion spring, which slide rail runs circumferentially between the stop part of the hub and the stop part of the belt pulley and forms part of the rotary stop. Thus, the sliding disc serves not only as an axial bearing of the spring plate of the hub rotating on the driver ring, but also as an intermediate layer that prevents the stop parts from coming into direct contact with each other. With regard to simplicity of production, sliding properties and noise dampening intermediate layer, the sliding disc expediently consists of plastic materials.

The spring plates are to be elevated axially in the form of a ramp, forming a step, the extensive end faces of the spring ends transmitting the drive torque from the step of the spring plate of the hub to the step of the spring plate of the belt pulley when the starter generator is driving the belt. In an alternative embodiment, the drive torque can be transmitted to the driven starter generator via the same pressure contact.

The positive fit acting in the opposite torque direction between the spring ends and the spring plates can be produced in that the spring ends are formed as tangents or secants to the circular shape of the torsion spring and are accommodated in corresponding moldings of the spring plates. In this case, the tangential or secant spring ends transmit the drive torque from the forming of the spring plate of the belt pulley to the forming of the spring plate of the hub when the starter generator is driven by the belt, wherein the winding body of the decoupler spring is constricted in diameter.

In an alternative form-fit connection, the axial end faces of the spring ends can each have a recess which encompass an axial elevation of the associated spring plate. The recesses in the spring ends of the driven starter generator transmit the drive torque from the axial elevation of the spring plate of the belt pulley to the axial elevation of the spring plate of the hub.

BRIEF DESCRIPTION OF THE DRAWINGS

Further characteristics are included in the following description and the drawings, which show a principle presentation and two embodiments of the belt pulley decoupler for a starter generator belt drive of an internal combustion engine.

DETAILED DESCRIPTION OF THE DRAWINGS

FIGS. 1a-c show the mechanical functional principle of a belt pulley decoupler according to the disclosure. It comprises a belt pulley marked P, a hub marked H and a decoupler spring marked E, which is clamped between the belt pulley P and the hub H and can be loaded in both directions. In the present case, the bidirectional loading capacity is symbolized by the spring ends of the decoupler spring E, which are attached to the belt pulley P and to the hub H in such a way that they transmit compressive forces as well as tensile forces. The stop parts of the rotary stop between the belt pulley P and the hub H are designated S1 or S2.

FIG. 1a: the pulley decoupler is in the unloaded rest position, and the two stop parts S1 and S2 are out of engagement and spaced apart.

FIG. 1b: the drive torque introduced into the belt pulley P by the belt and symbolized by the arrow drawn thereon is transmitted from the belt pulley P to the hub H, which drives the starter generator, via the now pressure-loaded coupler spring E.

FIG. 1c: the drive torque introduced into the hub H by the starter generator and symbolized by the arrow drawn thereon loads the decoupler spring in pulling direction, reducing the distance between the two stop parts S1 and S2 until the rotary stop engages. Thus the drive torque is transmitted in a first part from the decoupler spring E, which is then subjected to maximum tensile loading, and in a second part via the engaged rotary stop S1, S2 to the belt pulley P, which drives the belt.

Figure 2:
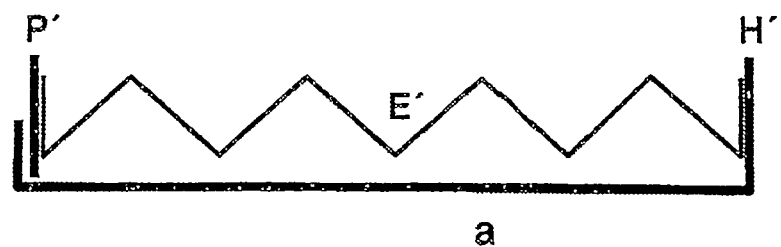
FIG. 2 illustrates the mechanical principle of the well-known belt pulley decoupler according to the above-mentioned EP 2 010 792 B1.
Figure 2:
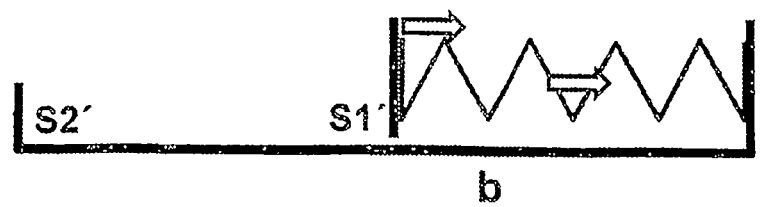
Figure 2:
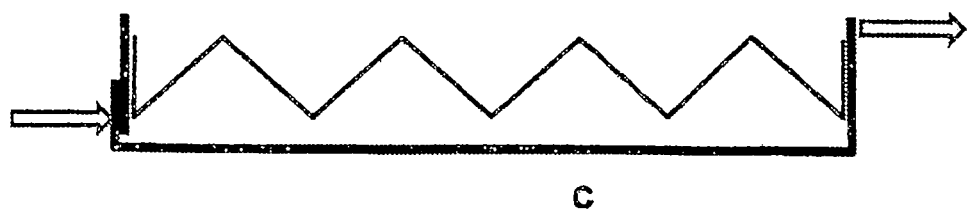

For the purpose of comparison, FIGS. 2a-c show the mechanical functional principle of the well-known belt pulley decoupler with rotary stop. The decoupler spring marked E' is only applied in one direction and in the present case can only be loaded with compressive forces on the belt pulley P' on the one hand and the hub H' on the other hand.

FIG. 2a: the belt pulley decoupler is in unloaded rest position.

FIG. 2b: the drive torque introduced into the belt pulley P' by the belt and symbolized by the arrow drawn thereon is transmitted from the belt pulley P' via the pressure-loaded decoupler spring E' to the hub H', which drives the starter generator.

FIG. 2c: the drive torque introduced into the hub H' by the starter generator and symbolized by the arrow drawn thereon is transmitted completely to the belt pulley P', which drives the belt, via the stop parts S1' and S2' of the engaged rotary stop, when the decoupler spring E' is not loaded.

Figure 3:
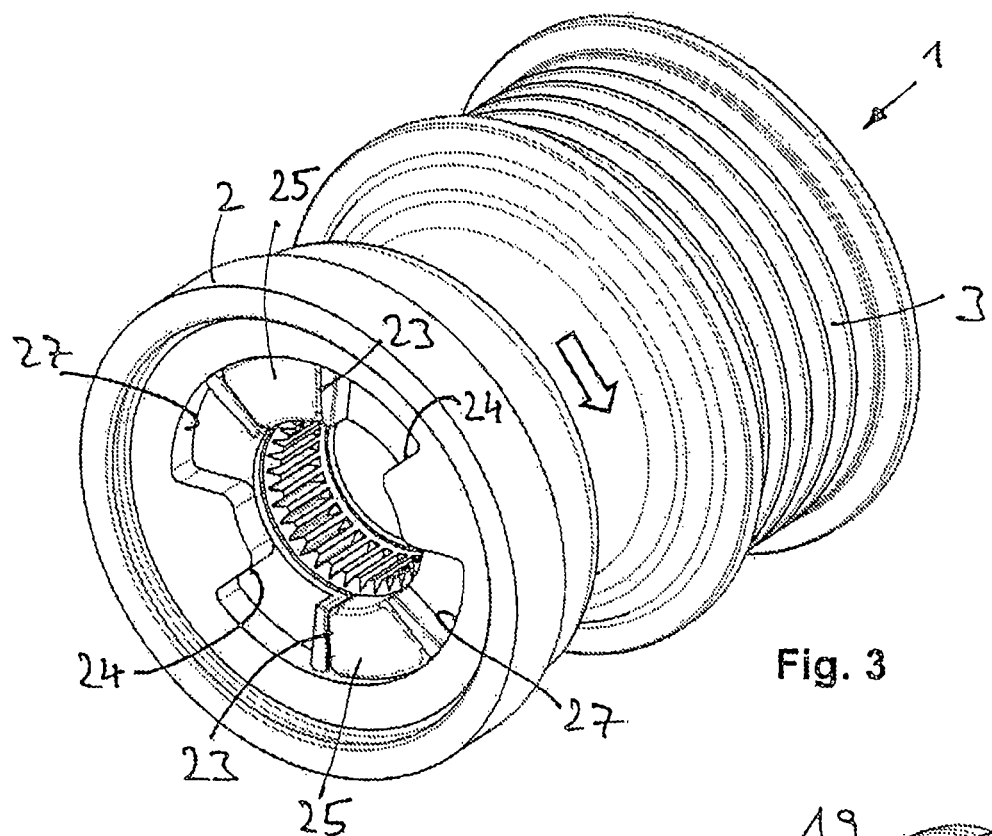
FIG. 3 illustrates a perspective overall presentation of the first belt pulley decoupler.
Figure 4:
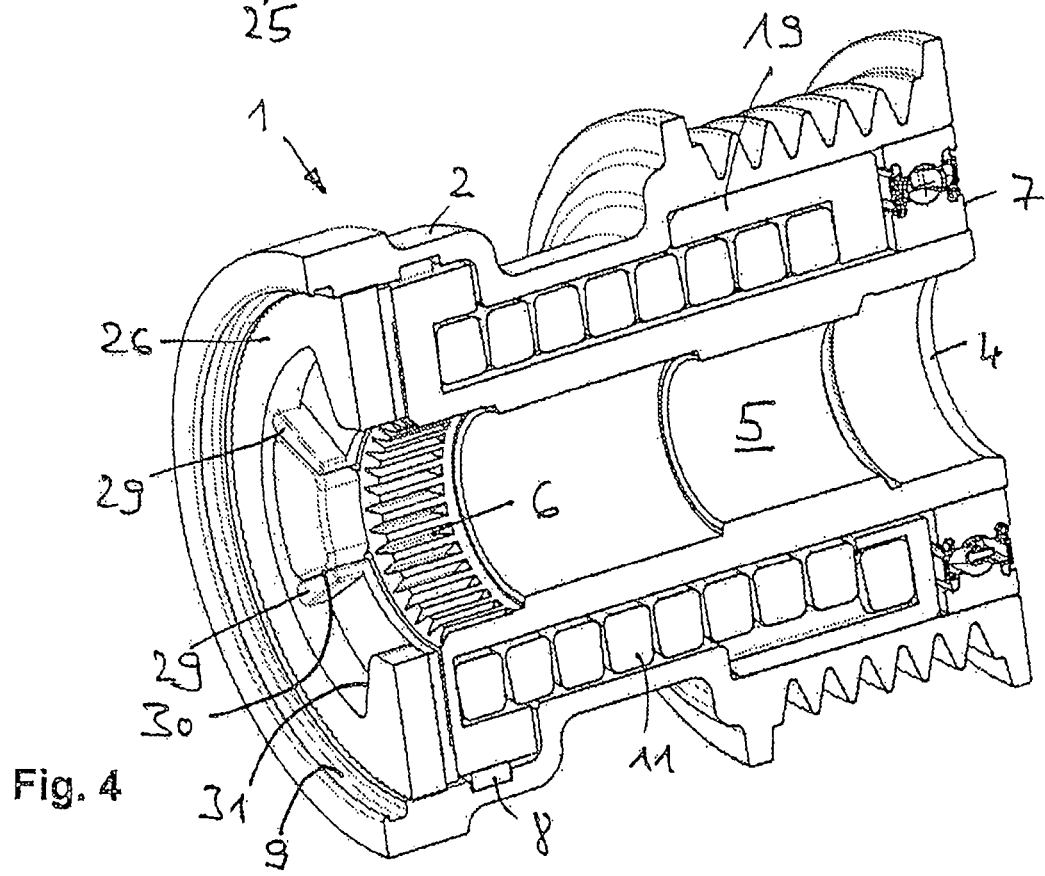
FIG. 4 illustrates a perspective longitudinal section of the first belt pulley decoupler.
Figure 5:
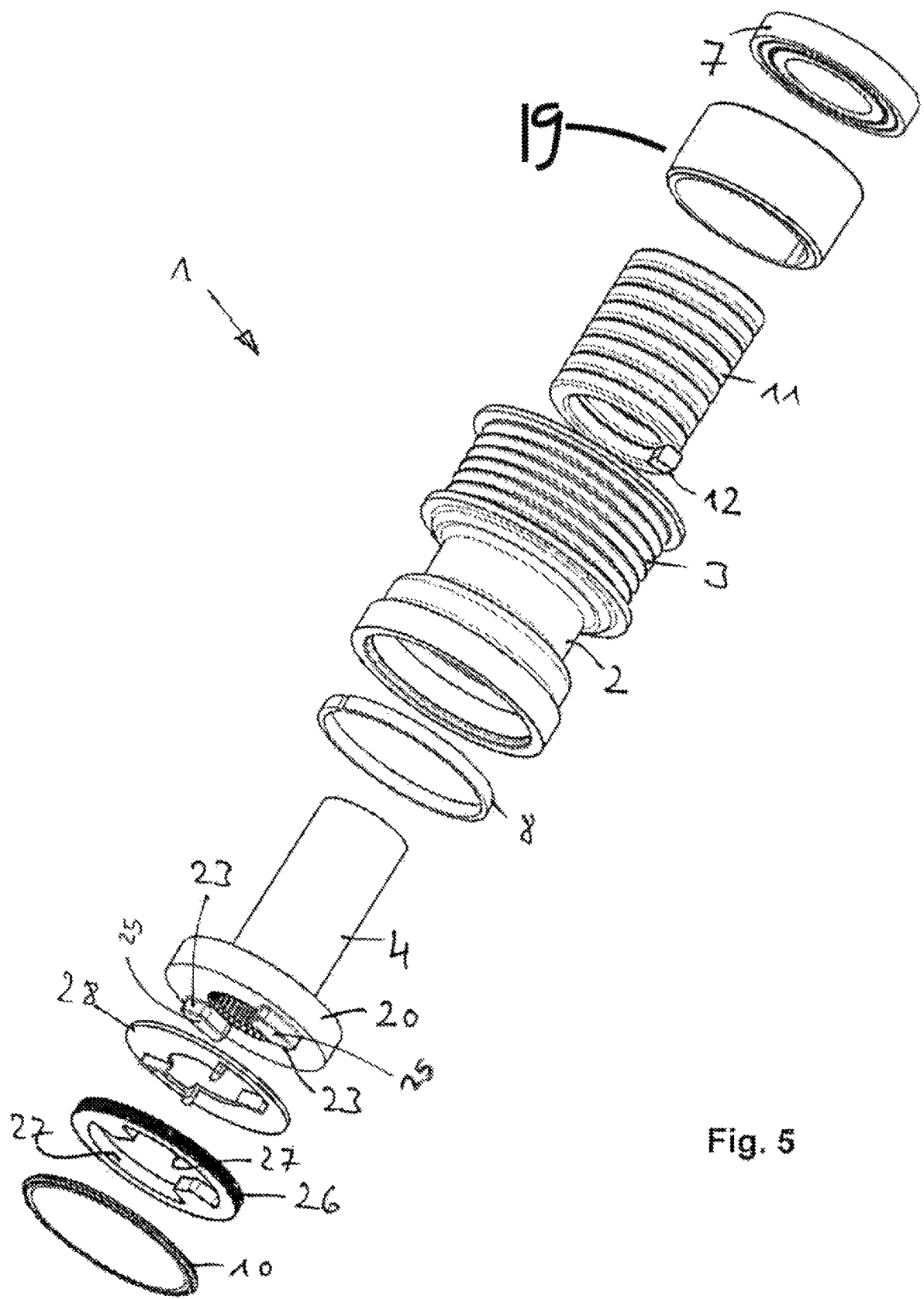
FIG. 5 illustrates a perspective exploded view of the first belt pulley decoupler.

FIGS. 3 to 5 show different views of the first embodiment of a belt pulley decoupler 1 according to the disclosure. A hollow cylindrical belt pulley 2, which has an outer surface 3 that is embraced by the belt and profiled according to the poly-V shape of the belt, is driven by the belt in the direction of rotation shown in FIG. 3. The belt pulley 2 is rotatably mounted on a hub 4, which is firmly screwed to the generator shaft of a starter generator. For this purpose, the hub 4 has an internal thread in the middle section 5 (not shown) and an internal multipoint screw 6 at the front end section remote from the generator as an engagement contour for the assembly tool. The belt pulley 2 is mounted on the hub 4 radially and axially at the generator end by means of a roller bearing 7 and radially at the end remote from the generator by means of a plain bearing 8. The roller bearing 7 is a single-row ball bearing sealed on both sides. The plain bearing 8 is a slotted polyamide radial bearing ring which is in direct sliding contact with the inner circumference of the belt pulley 2. The belt pulley 4 has a circumferential groove 9 at the end remote from the generator, into which a protective cap 10 is snapped after the belt pulley decoupler 1 has been screwed onto the generator shaft. The protective cap 10 is not mounted in FIGS. 3 and 4.

Figure 6:
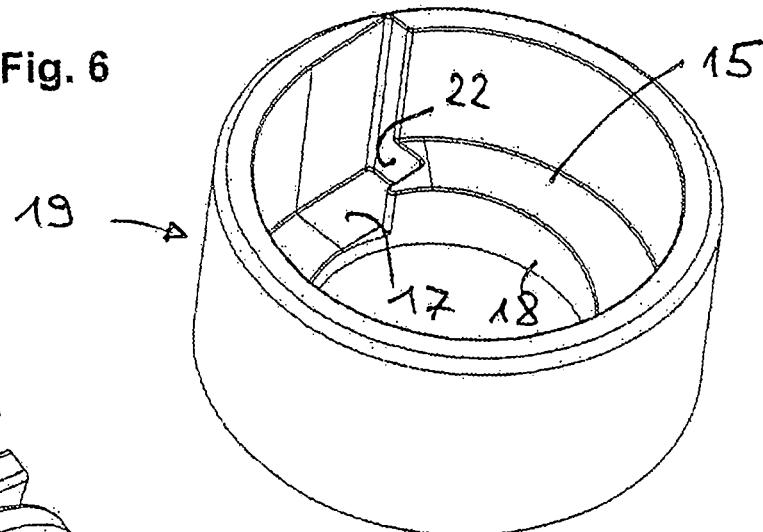
FIG. 6 illustrates a perspective individual depiction of the spring plate of the belt pulley of the first belt pulley decoupler.
Figure 7:
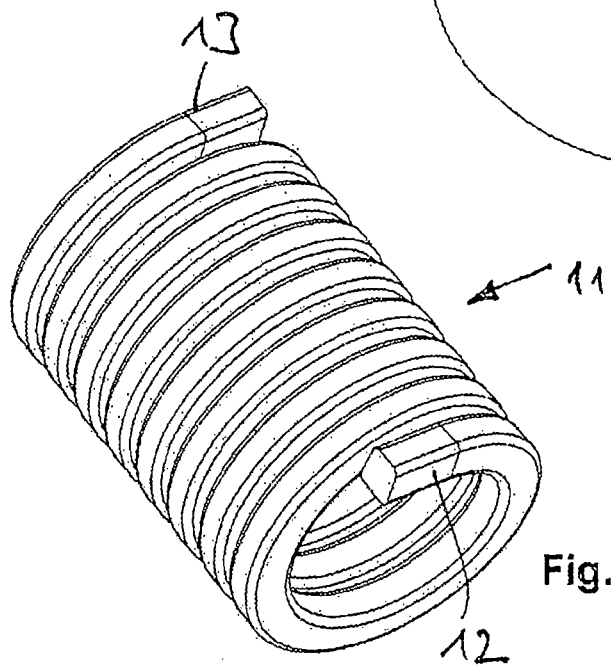
FIG. 7 illustrates a perspective individual depiction of the decoupler spring of the first belt pulley decoupler.
Figure 8:
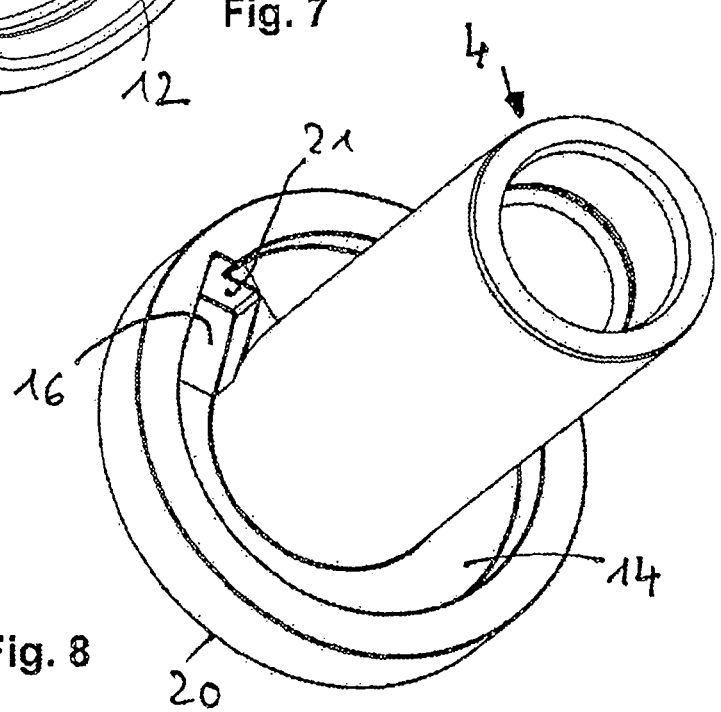
FIG. 8 illustrates a perspective individual depiction of the hub of the first belt pulley decoupler.

The decoupler spring 11 involves a component that may be essential for the function of the belt pulley decoupler 1. It is a helical torsion spring which extends in axial direction of the belt pulley decoupler 1 and has spring ends 12 and 13, which bear against a spring plate 14 of the hub 4 and against a spring plate 15 of the belt pulley 2 in such a way that the decoupler spring 11 can transmit drive torque in both torque directions in accordance with FIGS. 1b and 1c. The constructive design of the respective form-fitting system is described by including FIGS. 6 to 8. The spring ends 12, 13 shown there in greater detail are geometrically formed essentially as tangents to the circular shape of the spring winding body and received in corresponding moldings 16 and 17 of the spring plates 14 or 15, secured against twisting in both directions of rotation. The spring plate 15 of the belt pulley 2 is formed by a flange 18 of a sleeve 19 pressed into the belt pulley 2, and the spring plate 14 of the hub 4 is formed by a flange 20 integrally formed thereon in one piece, the outer circumference of which is enclosed by the plain bearing 8. Both spring plates 14, 15 ascend axially in the shape of a ramp in accordance with the end face contour of the decoupler spring 11 and, in the region of the moldings 16, 17, each form a step 21 and 22 which falls back to the starting point of the ramp and rest against the associated extensive end faces of the spring ends 12, 13.

Another component involves a rotary stop, which has two stop parts 23 on the hub 4 and two stop parts 24 on the belt pulley 2, which come into contact at the same time. The stop parts 23 of the hub 4 are formed by circumferential end faces of cam-like drivers 25. These are axially located on the end face of the flange 20, which faces away from the decoupler spring 11. The two stop parts 24 of the belt pulley 2 are formed by a driver ring 26 with two recesses 27 fastened therein, in which the drivers 25 can be rotated and the circumferential extension of which is limited by the stop parts 24. The mounting of the driver ring 26 in the belt pulley 2, which is designed to transmit the relatively high start and boost torques, is reinforced by a collar on the outer circumference of the driver ring 26.

The rotatability of the drivers 25 within the recesses 27 is configured symmetrically so that—starting from the unloaded condition of the decoupler spring 11—the non-impact torsion angle is equal in both load directions of the decoupler spring 11. Different from this and depending on the spring stiffness of the drive torques to be transmitted in the generator and electric motor operation of the starter generator and the number of stop parts 23, 24, the stop-free torsion angles can be configured asymmetrically. For example, in the case of a rotary stop with only one pair of stop parts, the non-stop angle of rotation in generator operation can be selected either significantly larger or significantly smaller than in electric motor operation.

A plastic sliding disc 28 arranged between the driver ring 26 and the end face of the spring plate 14 serves, on the one hand, as an axial bearing of the hub 4 rotating in relation to the belt pulley 2 and, on the other hand, as a stop damper during the initial contact of the rotary stop. For this purpose, the sliding disc 28 is provided with two pairs of axial projections 29, which hold the sliding disc 28 on the drivers 25 and form part of the rotary stop, in that the projections 29 extend circumferentially between the stop parts 23 of the hub 4 and the stop parts 24 of the belt pulley 2, preventing their direct (metallic) contact.

On the functioning of the belt pulley decoupler 1:

1.) The starter generator is in generator operation and is driven by the belt in the direction of rotation as shown in FIG. 3. The decoupler spring 11 is loaded by pulling on the spring ends 12, 13 and consequently by constricting its winding diameter, wherein the drive torque of the belt is transmitted to the generator shaft via the outer casing 3 of the belt pulley 2—sleeve 19—molding 17 of the spring plate 15 of the belt pulley 2—tangential spring end 13 of the decoupler spring 11—decoupler spring 11—tangential spring end 12 of the decoupler spring 11—molding 16 of the spring plate 14 of the hub 4—hub 4. The elasticity of the decoupler spring 11 compensates the transmission of the torsional vibrations of the belt to the generator shaft.

Figure 1:
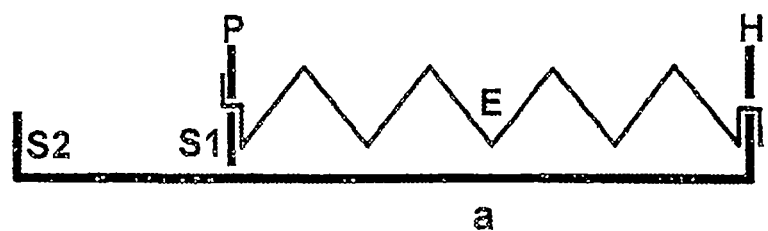
FIG. 1 illustrates the mechanical principle of an inventive belt pulley decoupler.
Figure 1:
Figure 1:
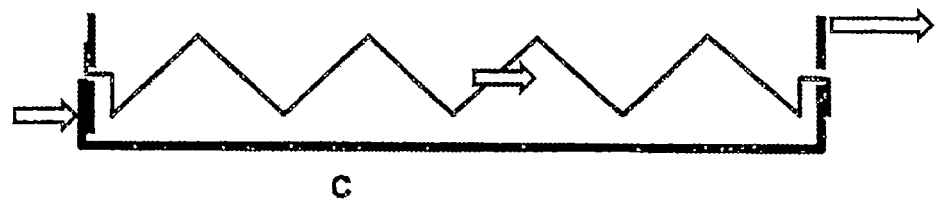

In this operating condition, the extensive distance between the stop parts 23 and 24 is on average greater than in the unloaded condition according to FIG. 1. Accordingly, the extensive distance between the respectively opposite end faces 30 of the drivers 25 and the restrictions 31 of the recesses 27 is also on average smaller than in unloaded condition. In the case of very high generator drive torques and excessive load, these rear contours also act as a rotary stop which, in the event of intervention, restricts the drive torque transmitted via the decoupler spring 11 and rigidly transmits the drive torque exceeding it.

2.) The starter generator is in electric motor operation and drives the belt. The hub 4 rotates with the drivers 25 in the direction of rotation shown in FIG. 3 in relation to the belt pulley 2 and the driver ring 26 until the drive torque of the generator shaft is transmitted to a first part via the decoupler spring 11 and to a second transcending part via the stop parts 23, 24 of the engaged rotary stop. The transmission via the decoupler spring 11, now widened in diameter, takes place via hub 4—step 21 of the spring plate 14 of the hub 4—circumferential end face of the spring end 12—decoupler spring 11—circumferential end face of the spring end 13—step 22 of the spring plate 15 of the belt pulley 2—sleeve 19—outer casing 3 of the belt pulley 2 on the belt.

Figure 9:
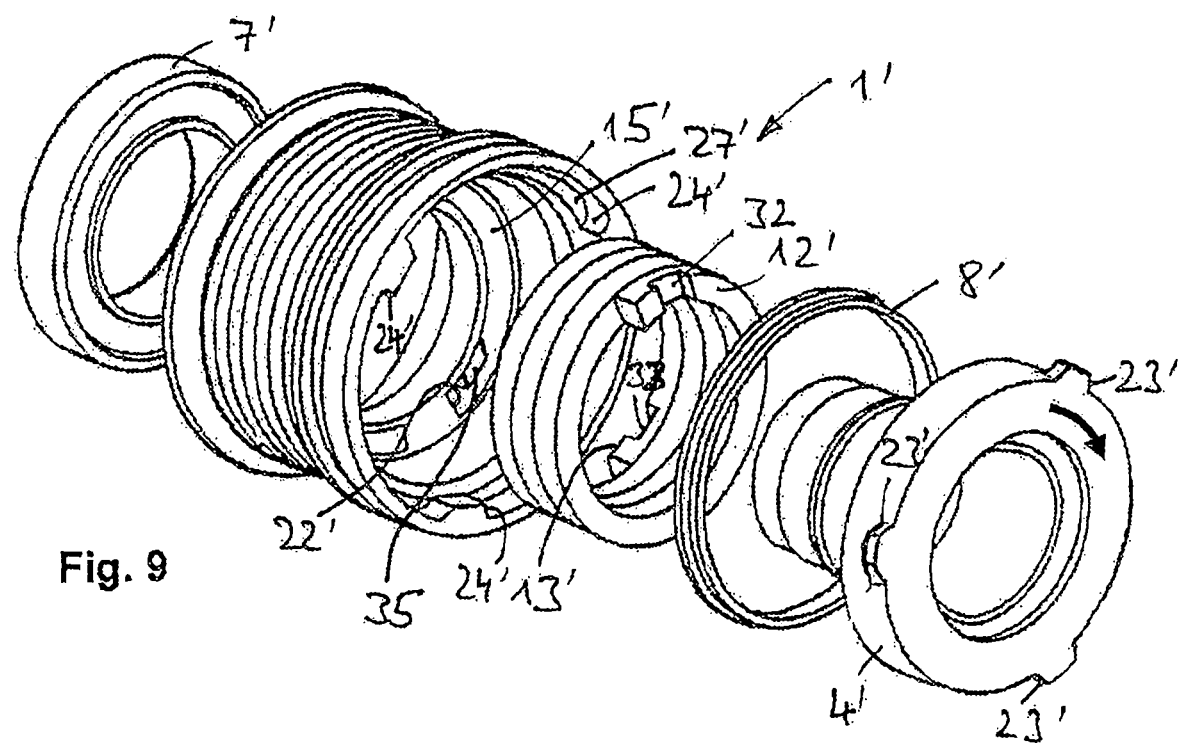
FIG. 9 illustrates a first perspective exploded view of the second belt pulley decoupler.
Figure 10:
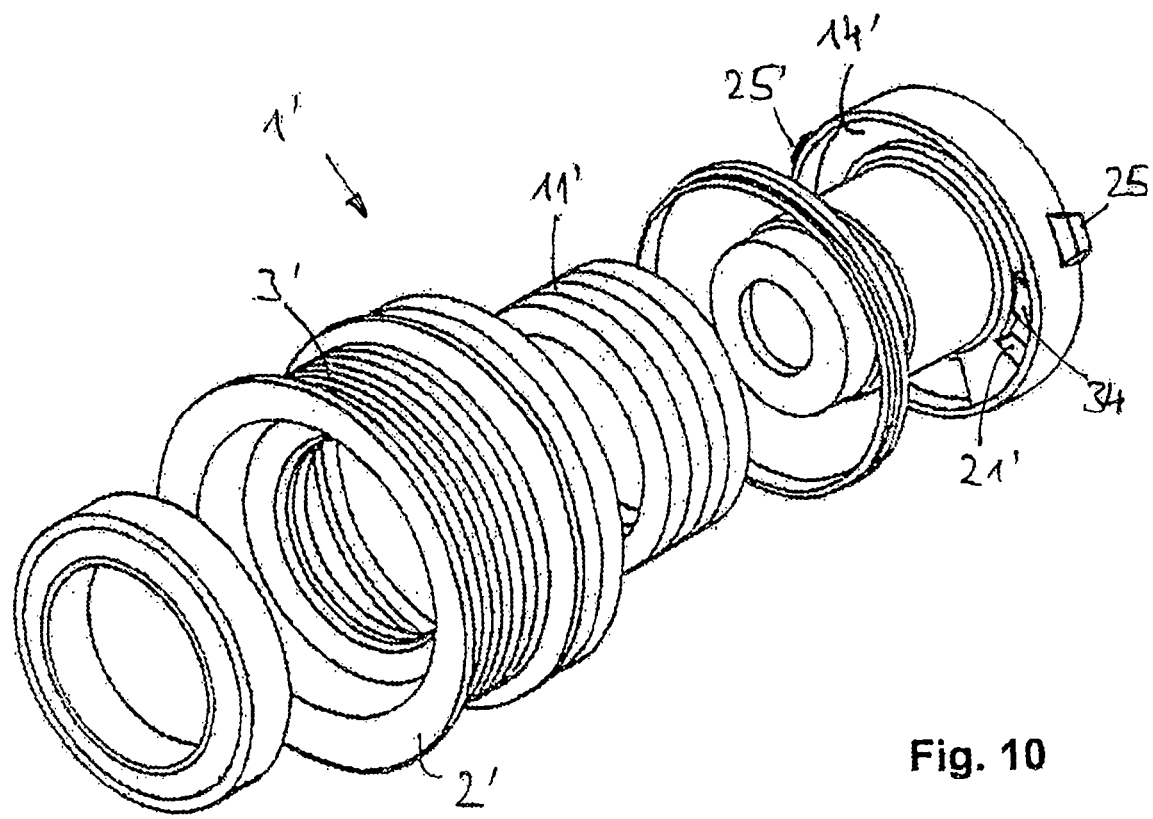
FIG. 10 illustrates a second perspective exploded view of the second belt pulley decoupler.

FIGS. 9 and 10 show the second embodiment of a belt pulley decoupler 1' according to the disclosure. On the one hand, it differs from the previously described belt pulley decoupler 1, which otherwise has the same functionality, by the type of positive fit between the spring ends 12', 13' of the decoupler spring 11' and the associated spring plates 14', 15'. On the other hand, it differs by the number and arrangement of the stop part pairs 23', 24'. The bearing of the belt pulley 2' on the hub 4' also takes place via a roller bearing 7' and a plain bearing 8'.

The belt pulley decoupler 1' rotates according to the arrow direction shown in FIG. 9 and—when looking at the starter generator from above—evenly in clockwise direction. In this case, the form-fit connection between the spring ends 12', 13' and the spring plates 14', 15', which is responsible for transmitting the generator drive torque, takes place via recesses 32, 33 in the axial end faces of the spring ends 12', 13', each of which encompasses an axial elevation 34, 35 on the associated spring plates 14', 15'.

The rotary stop is formed by three pairs of stop parts 23', 24', wherein the hub 4' has three radially projecting cam-like drivers 25', which project radially in relation to its cylindrical shape and which can be rotated in three recesses 27' running directly in the belt pulley 2'.

On the functionality of the belt pulley decoupler 1':

1.) The starter generator is in generator operation and is driven by the belt in the direction of rotation as shown in FIG. 9. The decoupler spring 11' is loaded by pulling on the spring ends 12', 13' and consequently by constricting its winding diameter, wherein the drive torque of the belt is transmitted to the generator shaft via the outer casing 3 of the belt pulley 2'—axial elevation 35 of the spring plate 15' of the belt pulley 2'—recess 33 of the spring end 13'—decoupler spring 11'—recess 32 of the spring end 12'—axial elevation 34 of the spring plate 14' of the hub 4'—hub 4'.

2.) The starter generator is in electric motor operation and drives the belt. The hub 4' rotates with the drivers 25' in the direction of rotation shown in FIG. 9 in relation to the belt pulley 2' until the drive torque of the generator shaft is transmitted to a first part via the decoupler spring 11' and to a second part via the stop parts 23', 24' of the engaged rotary stop. The transmission via the decoupler spring 11', now widened in diameter, takes place via hub 4'—step 21' of the spring plate 14' of the hub 4'—circumferential end face of the spring end 12'—decoupler spring 11'—circumferential end face of the spring end 13'—step 22' of the spring plate 15' of the belt pulley 2'—outer casing 3' of the belt pulley 2' on the belt.

LIST OF REFERENCE NUMERALS 1 belt pulley decoupler
2 belt pulley
3 outer casing
4 hub
5 middle section of the hub
6 internal multipoint screw
7 roller bearing
8 plain bearing
9 circumferential groove
10 protective cap
11 decoupler spring
12 spring end (on the part of the hub)
13 spring end (on the part of the belt pulley)
14 spring plate (on the part of the hub)
15 spring plate (on the part of the belt pulley)
16 molding (on the part of the hub)
17 molding (on the part of the belt pulley)
18 flange (on the part of the belt pulley)

19 sleeve
20 flange (on the part of the hub)
21 step (on the part of the hub)
22 step (on the part of the belt pulley)
23 stop part (on the part of the hub)
24 stop part (on the part of the belt pulley)
25 driver (on the part of the hub)
26 driver ring (on the part of the belt pulley)
27 recess (on the part of the belt pulley)
28 sliding disc
29 axial projection of the sliding disc
30 opposite end face of the driver
31 opposite restriction of the recess
32 recess in the spring end (on the part of the hub)
33 recess in the spring end (on the part of the belt pulley)
34 axial elevation (on the part of the hub)
35 axial elevation (on the part of the belt pulley)

The invention claimed is:

1. A belt pulley decoupler for transmitting drive torque between a belt of a starter generator belt drive and a starter generator, the belt pulley decoupler comprising:
   a belt pulley;
   a hub configured to be fastened on a generator shaft of the starter generator;
   a decoupler spring configured to transmit drive torque from the belt pulley to the hub when the starter generator is driven by the belt; and
   a rotary stop comprising a first stop part on the belt pulley and a second stop part on the hub, which transmits drive torque of the generator shaft from the hub to the belt pulley when the starter generator is driving the belt;
   wherein the decoupler spring is loaded in both directions of rotation and participates in the transmission of the drive torque from the hub to the belt pulley when the starter generator is driving the belt;
   the decoupler spring comprising spring ends at opposing torque directions attached in a form-fit manner with a spring plate of the belt pulley and a spring plate of the hub; and
   wherein axial end faces of the spring ends each have a recess which encompasses an axial elevation of the associated spring plate, wherein the recesses in the spring ends transmit the drive torque.

2. A belt pulley decoupler according to claim 1, wherein the decoupler spring is a torsion spring which extends in axial direction of the belt pulley decoupler.

3. A belt pulley decoupler according to claim 2, wherein the second stop part is formed by a driver which can be rotated in a recess restricted by the first stop part.

4. A belt pulley decoupler according to claim 3, wherein the recess is formed by a driver ring fastened in the belt pulley.

5. A belt pulley decoupler according to claim 4, wherein a sliding disc with an axial projection is arranged between the driver ring and an end face of the hub facing away from the torsion spring, wherein the sliding disc runs circumferentially between the second stop part and the first stop part and forms part of the rotary stop.

6. A belt pulley decoupler according to claim 2 wherein the spring plates are elevated axially in the form of a ramp, forming a step, with end faces of the spring ends transmitting the drive torque from the step of the spring plate of the hub to the step of the spring plate of the belt pulley when the starter generator is driving the belt.

7. A belt pulley decoupler according to claim 6, wherein the spring ends comprise a tangential spring end or a secant spring end;
   wherein the spring ends are received in corresponding moldings of the spring plates to secure against twisting in both directions of rotation.

8. A belt pulley decoupler according to claim 6, wherein the recesses in the spring ends transmit the drive torque from the axial elevation of the spring plate of the belt pulley to the axial elevation of the spring plate of the hub when the generator is driven by the belt.

9. A belt pulley decoupler for transmitting drive torque between a belt of a starter generator belt drive and a starter generator, the belt pulley decoupler comprising:
   a belt pulley;
   a hub configured to be fastened on a generator shaft of the starter generator;
   a decoupler spring configured to transmit drive torque from the belt pulley to the hub when the starter generator is driven by a belt, wherein the decoupler spring is loaded in both directions of rotation and participates in the transmission of the drive torque from the hub to the belt pulley when the starter generator is driving the belt;
   the decoupler spring comprising spring ends at opposing torque directions attached in a form-fit manner with a spring plate of the belt pulley and a spring plate of the hub; and
   wherein axial end faces of the spring ends each have a recess which encompasses an axial elevation of the associated spring plate, wherein the recesses in the spring ends transmit the drive torque.

10. The belt pulley decoupler of claim 9, further comprising a rotary stop having a first stop part on the belt pulley and a second stop part on the hub, wherein the rotary stop is configured to transmit drive torque of the generator shaft from the hub to the belt pulley when the starter generator is driving the belt.

11. The belt pulley decoupler of claim 10, wherein the decoupler spring is a torsion spring which extends in axial direction of the belt pulley decoupler.

12. The belt pulley decoupler of claim 11, wherein the second stop part is formed by a driver which can be rotated in a recess restricted by the first stop part.

13. The belt pulley decoupler of claim 11, wherein the first stop part includes a first plurality of tabs extending radially inwardly from the belt pulley, and the second stop part includes a second plurality of tabs that can rotate between adjacent tabs of the first plurality of tabs.

* * * * *